United States Patent
Kang et al.

(10) Patent No.: US 9,604,851 B2
(45) Date of Patent: Mar. 28, 2017

(54) METHOD FOR PRODUCING HIGH SILICA ZEOLITE USING RECOVERED SILICA FILTRATE, AND HIGH SILICA ZEOLITE PRODUCED ACCORDING TO SAID METHOD

(71) Applicant: KOREA RESEARCH INSTITUTE OF CHEMICAL TECHNOLOGY, Daejeon (KR)

(72) Inventors: Na Young Kang, Chungcheongnam-do (KR); Yong ki Park, Daejeon (KR); Won Choon Choi, Daejeon (KR); Hwi Min Seo, Daejeon (KR); Chul Wee Lee, Daejeon (KR)

(73) Assignee: KOREA RESEARCH INSTITUTE OF CHEMICAL TECHNOLOGY, Daejeon-si (KR)

( * ) Notice: Subject to any disclaimer, the term of this patent is extended or adjusted under 35 U.S.C. 154(b) by 177 days.

(21) Appl. No.: 14/603,759

(22) Filed: Jan. 23, 2015

(65) Prior Publication Data

US 2015/0139898 A1 May 21, 2015

Related U.S. Application Data

(63) Continuation of application No. PCT/KR2013/005900, filed on Jul. 3, 2013.

(30) Foreign Application Priority Data

Jul. 25, 2012 (KR) .................. 10-2012-0081167

(51) Int. Cl.
  *C01B 39/02* (2006.01)
  *C01B 39/38* (2006.01)
  *C01B 39/26* (2006.01)

(52) U.S. Cl.
  CPC ............. *C01B 39/38* (2013.01); *C01B 39/02* (2013.01); *C01B 39/26* (2013.01); *C01P 2002/72* (2013.01); *C01P 2004/03* (2013.01)

(58) Field of Classification Search
  CPC .......... C01B 39/02; C01B 39/26; C01B 39/38
  See application file for complete search history.

(56) References Cited

U.S. PATENT DOCUMENTS

| | | | |
|---|---|---|---|
| 2,605,228 A | 7/1952 | Alexander et al. | |
| 2,900,348 A | 8/1959 | Ahlberg et al. | |
| 2015/0139898 A1* | 5/2015 | Kang | C01B 39/26 423/700 |

FOREIGN PATENT DOCUMENTS

| | | |
|---|---|---|
| JP | 2508713 B2 | 4/1996 |
| JP | 1020060131204 A | 12/2006 |

(Continued)

OTHER PUBLICATIONS

International Search Report mailed Oct. 14, 2013; PCT/KR2013/005900.

(Continued)

*Primary Examiner* — David M Brunsman
(74) *Attorney, Agent, or Firm* — Ladas & Parry LLP

(57) ABSTRACT

Provided are a method of manufacturing a high silica zeolite using a recovered silica filtrate, and a high silica zeolite manufactured according to the method. To this end, the present invention provides the method of manufacturing the high silica zeolite using the recovered silica filtrate, including manufacturing a solated agglomerated silica from the silica filtrate including a metal salt (step 1); filtering and washing the solated agglomerated silica of step 1 to manufacture a silica cake from which the metal salt is removed (step 2); peptizing the silica cake to manufacture a silica sol (step 3); and manufacturing the high silica zeolite using the silica sol manufactured in step 3 as a silica source (step 4).

(Continued)

Further, the present invention provides a high silica zeolite manufactured from a recovered silica filtrate through the manufacturing method and having a Si/Al mole ratio of 5 or more. According to the present invention, it is possible to provide a process of manufacturing a high silica zeolite, in which economic feasibility, a manufacturing cost, and a manufacturing time of process steps are reduced, by reusing a recovered silica filtrate to manufacture the zeolite.

8 Claims, 3 Drawing Sheets

(56) References Cited

FOREIGN PATENT DOCUMENTS

| KR | 1020070020354 A | 2/2007 |
|---|---|---|
| KR | 1020090049713 A | 5/2009 |
| KR | 1020110049597 A | 5/2011 |
| KR | 1020120001122 A | 1/2012 |

OTHER PUBLICATIONS

Huihua Pan, et al; "A Green and Efficient Synthesis of ZSM-5 Using NaY as Seed with Mother Liquid Recycling and in the Absence of Organic Template", Ind. Eng. Chem. Res. vol. 49, pp. 7294-7302; Published on Web Jul. 14, 2010.

\* cited by examiner

METHOD FOR PRODUCING HIGH SILICA ZEOLITE USING RECOVERED SILICA FILTRATE, AND HIGH SILICA ZEOLITE PRODUCED ACCORDING TO SAID METHOD

CROSS-REFERENCES TO RELATED APPLICATION

This patent application is a U.S. national phase under 35 U.S.C 371 of PCT/KR2013/005900 filed on Jun. 3, 2013, which claims the benefit of priority from Korean Patent Application No. 10-2012-0081167, filed on Jun. 25, 2012, in the Korean Intellectual Property Office, the disclosure of which is incorporated herein by reference in its entirety.

TECHNICAL FIELD

The present disclosure relates to a method of manufacturing a high silica zeolite using a recovered silica filtrate, and a high silica zeolite manufactured according to the method.

BACKGROUND ART

A zeolite has a peculiar three-dimensional structure of alumino-silicate and has a large micropore and an excellent ion exchanging property as compared to another aluminosilicate crystal, thus being extensively used as a catalyst, an adsorbent, a molecular sieve, and an ion exchanger. The purpose of a natural zeolite is limited due to a structural limitation thereof, but the purpose of a synthetic zeolite is gradually expanding. In order to diversify the purpose of the zeolite, an economical synthesis method is required, and a crystal size, a particle size distribution, and a shape of the zeolite need to be arbitrarily adjusted.

A high silica zeolite is a zeolite having a high ratio of silica to alumina, and in ZSM-5 as one of the zeolites, a three-dimensional pore having 10-tetrahedron rings is formed, and a size thereof is approximately an intermediate of those of zeolite A, zeolite X, and zeolite Y. Further, ZSM-5 is a kind of pentasil zeolite as a shape-selective catalyst having peculiar adsorption and diffusion properties, in which a $SiO_2/Al2O3$ ratio is high and thus, generally, thermal stability is good, there is hydrophobicity, a Lewis acid site is large, and a Bronsted acid site is small. Particularly, gasoline fractions having a high octane number may be directly obtained from methanol by a MTG process, and ZSM-5 is known to have excellent selectivity to the gasoline fractions.

Since first development of ZSM-5 having a high silica content by Mobil company in the early 1970s, many studies of this material have been conducted due to peculiar catalytic activity and shape selectivity caused by a molecular sieve effect of this material. Unlike a general aluminolsilicate zeolite, various kinds of organic materials have been used as a structure inducing material for forming a structure to manufacture ZSM-5.

Until now, among the organic materials known to be effective to form the structure of ZSM-5, tetrapropyl ammonium cations are known to have the best structure inducing effect, and ZSM-5 that has been come onto the market in recent years is mainly synthesized by using the aforementioned material. However, even though the organic structure inducing materials including the tetrapropyl ammonium ions have the excellent structure inducing effect, since the organic structure inducing materials are disadvantageous in terms of economic and environmental aspects, studies have been conducted to exclude use of the organic structure inducing materials, and some processes relating to the studies have been developed. The reason why the organic structure inducing materials are excluded is that the materials are very expensive and have very strong toxicity, thus causing environmental pollution. Further, in the case where ZSM-5 is synthesized by using the organic structure inducing materials, secondary costs are required to treat toxic unreacted organic structure inducing materials contained in waste water.

Further, the structure inducing material contained in the manufactured ZSM-5 crystal particles should be thermally decomposed to be removed through calcination at 550° C. or more before used, and in the case where thermal decomposition does not completely occur during a removal process by calcination, blocking of pores may occur to cause fatal flaws to catalytic activity. Further, an additional burden of expense according to calcination and air pollution due to discharge gas generated during thermal decomposition of the organic materials are unavoidable.

Accordingly, in order to overcome the aforementioned limitations, Flanigen et al reported for the first time a method of synthesizing ZSM-5 using or not using a crystalline nucleus with exclusion of an organic structure inducing material. However, in the aforementioned method, a reaction time is very long 68 to 120 hours. Further, in the case where ZSM-5 is synthesized with exclusion of the organic structure inducing material, since synthesis is very sensitively affected by reaction conditions, meticulous care is required.

Meanwhile, examples of factors affecting synthesis of the high silica zeolite may include a type of a silica source, a Si/Al ratio, a concentration of an alkali solution, the mixing order of reactants, a crystallization temperature, a crystallization time, the degree of aging, and presence of agitation. Among the various factors, the type of the silica source is known as the most important factor.

According to Eastern Germany Patent No. 207185, generally, sodium silicate and a silica sol are used as a silica source. Sodium silicate is a type where water is added to solid silicate (cullet) to perform dissolving and is cheapest among the silica sources, but contains an alkali component in a great amount, and thus there is difficulty in controlling of a reactant composition, and a sulfuric acid or aluminum sulfate should be added to control an alkali concentration in sodium silicate.

Further, since a reaction condition is complicated, the zeolite is non-uniformly crystallized, and a cost of post-treatment such as removal of a metal salt is high.

According to Eastern Germany Patent No. 207186, in the case where a silica sol is used as a silica source, even though the silica sol has good reactivity and is easily treated, a raw material cost is high as compared to another silica source, and a silica component is finely dispersed in water in a great amount in a colloidal state and is rapidly reacted with an alumina component to generate a hydrogel, and thus in order to prevent this, the two components should come into contact with each other in a dilution state. In this case, since a solid content is low based on particles crystallized during a zeolite synthesis process and zeolite crystal particles are finely dispersed in a unit particle state, many loads occur during filtrate separation and water-washing processes, unreacted components are discharged while being contained in a great amount in the filtrate and a water-washing solution, and thus, resultantly, unit productivity is low, accordingly, there is a limitation as an industrial production method.

In addition, Korean Patent Application Laid-Open No. 10-2007-0020354 discloses a method of manufacturing a zeolite molecular sieve catalyst having a small crystal size by using diatomite or silica aerogel as a main silica source, adding a seed determining alignment agent, a silica sol, and sodium silicate for kneading and shaping, and performing gas-solid crystallization by organic amine and steam to perform conversion into an integrated zeolite having the small crystal size. However, in the aforementioned method, a nano-sized seed and organic amine are used to obtain the zeolite having fine particles, thus increasing a process cost.

As described above, according to the method of synthesizing the high silica zeolite reported until now, in the case where the high silica zeolite is synthesized using low-priced sodium silicate as the silica source by the method of excluding the organic structure inducing material, a chemical composition of a reactant capable of synthesizing the zeolite having high crystallinity is limited, and the zeolite having a long crystallization time and low particle uniformity is synthesized. Further, in the case where the high silica zeolite is synthesized during a practical process, since about 40 to 70 wt % of the silica used as the raw material is present in an unreacted state in the filtrate, production yield of the zeolite is low and a post-treatment cost is high due to generation of a great amount of waste water. Therefore, there is a demand for developing a zeolite synthesis technology of recovering a great amount of unreacted silica generated during synthesis of the high silica zeolite to be reused and thus prevent a waste of a synthesis raw material and minimize generation of waste water.

Ind. Eng. Chem. Res. (vol. 49, 7294 (2010)) reports that when a high silica zeolite is synthesized, even though a filtrate containing an unreacted silica is recovered to be reused during synthesis of the zeolite, there is no problem in synthesis. However, in the case where a metal salt generated during synthesis is not removed from the filtrate but repeatedly reused, since the metal salt is accumulated in a mother liquid to affect synthesis, there is a limitation in reuse and recovery, and thus the metal salt generated when the zeolite is synthesized should be removed to recover the unreacted silica from the filtrate and repeatedly reuse the silica.

Meanwhile, methods of manufacturing the silica sol from sodium silicate have been reported. U.S. Pat. No. 2,605,228 proposes a method of manufacturing a silica sol by diluting a sodium silicate solution having a mole ratio of $SiO_2/Na_2O$ of 3.2/1 by water, performing acid treatment by a sulfuric acid or a hydrochloric acid, performing heat treatment at 60 to 100° C. to grow particles, adding divalent cations to perform agglomeration, and peptizing a precipitated silica cake by an alkali through filtering, washing, and cation exchanging processes. Further, Japanese Patent Application Laid-Open No. 63-285112 describes a method of manufacturing a silica sol, which includes treating an alkali metal silicate aqueous solution by a strong cation exchange resin in order to obtain a colloidal solution of active silica, adjusting a pH of silicate from 0 to 2, treating the solution by a strong acidic cation exchange resin, treating the solution by a basic anion exchange resin, and treating the solution by the strong acidic cation exchange resin.

As described above, in the existing methods of manufacturing the silica sol from sodium silicate, since a complicated process of manufacturing the silica sol is performed through a process of manufacturing the sodium silicate solution, an ion exchange process using the ion exchange resin, and agglomeration and peptizing processes using the divalent ions, a high treatment cost and a great amount of waste water are required during deoxidation and washing processes by an acid reaction or a regeneration process of the ion exchange resin after the ion exchange reaction.

Further, since a great amount of metal salt as well as the unreacted silica is contained as an impurity in the filtrate generated during synthesis of the zeolite, in the case where the method of manufacturing the sol from pure sodium silicate is applied to manufacture the silica sol from the filtrate containing the metal salt, agglomeration is severe, and thus it is difficult to perform solation.

Accordingly, the inventors of the present invention found that when a method of manufacturing a high silica zeolite, in which a silica sol is manufactured from a recovered silica filtrate to be reused as a silica source during a process of synthesizing the high silica zeolite, is used, since a cation exchange process is omitted due to an oxyanion effect during a process of converting the silica filtrate into the silica sol, a manufacturing process is simplified, a metal salt included as an impurity during a solation process is removed to prevent agglomeration of the silica sol and thus control a particle size of the silica sol, a process energy cost, a chemical treatment cost, and a waste water treatment cost are reduced, and a manufacturing time is shortened, thereby accomplishing the present invention.

DISCLOSURE OF THE INVENTION

Technical Problem

One object of the present invention is to provide a method of manufacturing a high silica zeolite using a recovered silica filtrate, and a high silica zeolite manufactured according to the method.

Technical Solution

In order to achieve the object, the present invention provides a method of manufacturing a high silica zeolite using a recovered silica filtrate, including manufacturing a solated agglomerated silica from the silica filtrate including a metal (step 1); filtering and washing the solated agglomerated silica of step 1 to manufacture a silica cake from which the metal salt is removed (step 2); peptizing the silica cake to manufacture a silica sol (step 3); and manufacturing the high silica zeolite using the silica sol manufactured in step 3 as a silica source (step 4).

Another object of the present invention is to provide a high silica zeolite manufactured from a recovered silica filtrate through the manufacturing method and having a Si/Al mole ratio of 5 or more.

Advantageous Effects

According to the present invention, when a method of manufacturing a high silica zeolite, in which a silica sol is manufactured from a recovered silica filtrate to be reused as a silica source during a process of synthesizing the high silica zeolite, is used, since a cation exchange process is omitted due to an oxyanion effect during a process of converting the silica filtrate into the silica sol, a manufacturing process is simplified, and a metal salt included as an impurity during a solation process is removed to prevent agglomeration of the silica sol and thus control a particle size of the silica sol. Further, it is possible to reduce an energy cost, a chemical treatment cost, and a waste water treatment cost and shorten a manufacturing time by reusing the discarded silica filtrate.

BRIEF DESCRIPTION OF THE DRAWINGS

The above and other objects, features and other advantages of the present invention will be more clearly understood from the following detailed description taken in conjunction with the accompanying drawings, in which.

MODE FOR CARRYING OUT THE INVENTION

Figure 1:
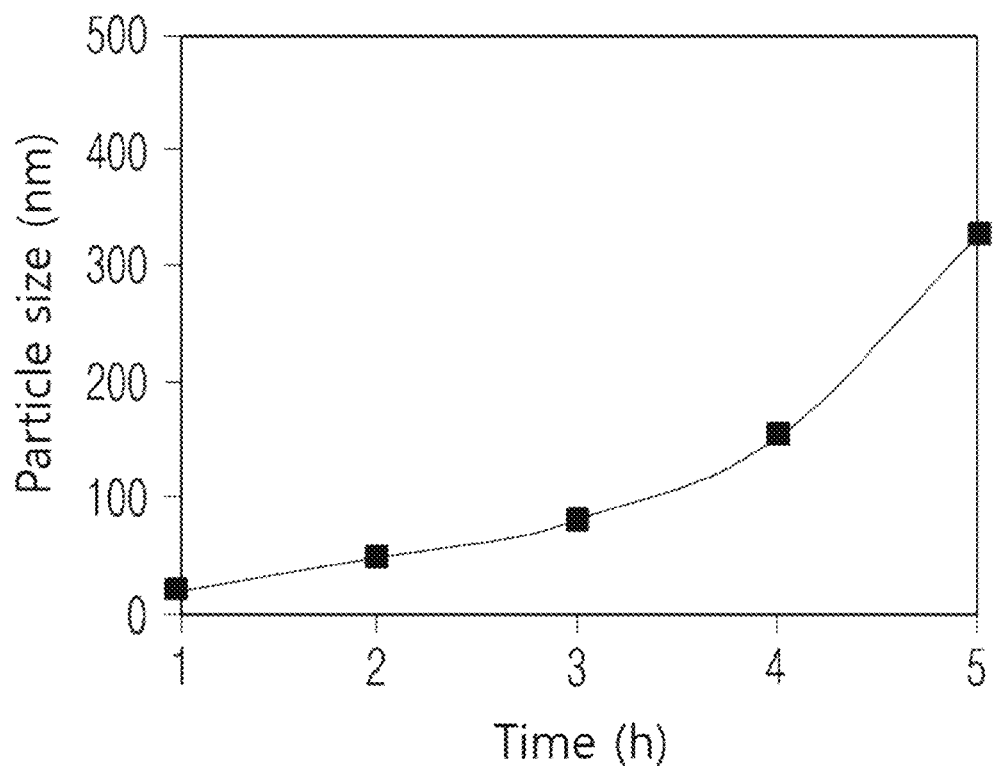
FIG. 1 is a graph illustrating a size of a silica sol particle according to an addition time of a recovered silica of Examples 1 to 5 of the present invention.

One object of the present invention is to provide a method of manufacturing a high silica zeolite using a recovered silica filtrate, and a high silica zeolite manufactured through the method. To this end, the present invention provides a method of manufacturing a high silica zeolite by using a recovered unreacted silica during a process of synthesizing the high silica zeolite to simplify a manufacturing process and reduce a cost and a time, and a high silica zeolite manufactured from a recovered silica filtrate through the method.

The present invention provides a method manufacturing a high silica zeolite using a recovered silica filtrate, including manufacturing a solated agglomerated silica from the silica filtrate including a metal salt (step 1); filtering and washing the solated agglomerated silica of step 1 to manufacture a silica cake from which the metal salt is removed (step 2); peptizing the silica cake to manufacture a silica sol (step 3); and manufacturing the high silica zeolite using the silica sol manufactured in step 3 as a silica source (step 4).

Hereinafter, the present invention will be described in detail for each step.

In the method of manufacturing the high silica zeolite according to the present invention, step 1 is a step of manufacturing the solated agglomerated silica from the silica filtrate including the metal salt.

The solated agglomerated silica means a silica obtained by agglomerating the silica sol grown from the silica filtrate and performing gelation.

In the method of manufacturing the high silica zeolite according to the present invention, in step 1, it is preferable that the solated agglomerated silica be manufactured by growing the silica filtrate including the metal salt from a nucleus, and performing solation and then agglomeration. Specifically, after an acid may be added to a silicate aqueous solution in a heating state to grow the nucleus, the acid and the silica filtrate including the metal salt discharged from a process of manufacturing the silica zeolite may be simultaneously added to the grown nucleus in a heating state to synthesize the silica sol, and the silica sol may be agglomerated to manufacture the solated agglomerated silica.

In the method of manufacturing the high silica zeolite according to the present invention, it is preferable that the nucleus be generated by mixing a silicate that is one kind selected from the group consisting of potassium silicate, sodium silicate, lithium silicate, and a mixture thereof, including 1 to 20 wt % of silica, and the acid. The silicates are a supply source of the nucleus for synthesizing the silica sol, in the case where the content of the silica included in the silicate is less than 1 wt %, since the number of supplied nuclei is very small, particles obtained after solation are rapidly grown, and thus it is difficult to obtain a colloidal solution, and in the case where the content is more than 20 wt %, since the silica is excessively supplied, it is difficult to obtain a colloidal solution where the nucleus is uniformly generated in the solution. That is, the size of the particle solated to be grown may be controlled according to the number of nuclei. It is more preferable to use the silicate including 10 to 15 wt % of silica.

As the acid added during the aforementioned process, one kind of acid selected from the group consisting of a hydrochloric acid, a phosphoric acid, and a sulfuric acid may be used, and preferably, the sulfuric acid may be used. The order of addition of an alkali metal silicate and the acid is not important, but in order to grow the nucleus in a uniform size, before the acid is added to the silicate, the acid is diluted in a content of preferably about 1 to 10 wt % and more preferably 1.5 to 5.0 wt % to use, and it is preferable that the degree of neutralization of the silicate by the acid be maintained at 80 to 100%.

In this case, it is preferable that heating for forming the nucleus be performed at 50° C. to 100° C. for 10 to 50 minutes. In the case where heating is performed at a temperature of less than 50° C. or a reaction time is short, since the unreacted silica is present in a great amount, an agglomeration reaction to the silica sol is not smoothly performed, and thus it is difficult to perform solation through peptizing during a subsequent step, and in the case where heating is performed at a temperature of more than 100° C. or the reaction time is long, since excessive energy more than necessary is supplied, the particles are not grown from the nucleus to the sol but are directly converted into the solated agglomerated silica.

After the nucleus is formed, the silica present in the filtrate and the acid may be simultaneously continuously added to grow the silica sol. Since a great amount of metal salt is contained in the used filtrate containing the silica, a reaction condition should be determined by a concept that is different from an existing method of manufacturing a silica sol using sodium silicate. Generally, a growth ratio of particles in a colloidal solution is determined by rates of an initiation reaction and a promotion reaction. Unlike the step of generating the nucleus, a condensation reaction for growing the particles more relates to a particle size growth ratio and includes all processes of crystallization. A condensation reaction rate largely depends on an amount of sodium sulfate ($Na_2SO_4$) present in the filtrate. When the high silica zeolite is synthesized, in the case where the silicate having an alkali component in an excessive amount is used, an excessive amount of neutralizing agent should be added to increase a production yield of the zeolite, and thus a great amount of metal salt is generated. As described above, in the case where an excessive amount of metal salt is present, since a condensation reaction is accelerated due to an oxyanion effect, agglomeration becomes serious, and thus it is difficult to obtain the sol having a desired size. Accordingly, it is important to prevent agglomeration by adjusting the reaction condition.

In step 1, the silica filtrate including the metal salt may include 1 to 5 wt % of silica ($SiO_2$) and 1 to 3 wt % of sodium sulfate ($Na_2SO_4$). After the high silica zeolite is synthesized in various synthesis regions, in the discharged silica filtrate, sodium oxide ($Na_2O$) and sodium sulfate ($Na_2SO_4$) are included in an excessive amount in addition to the silica, the concentration of the silica ($SiO_2$) is in the range of 1 to 5 wt %, the concentration of sodium oxide ($Na_2O$) is in the range of 1 to 5 wt %, and the concentration of sodium sulfate ($Na_2SO_4$) is in the range of 1 to 3 wt %. In this case, the concentration of the silica is about two times higher than that of sodium oxide and about 1.5 times higher than that of sodium sulfate, and the metal salt is removed through filtering and washing during step 2 of the manufacturing method according to the present invention, and thus the aforementioned concentration of the metal salt does not act as a limitation factor.

When the acid and the silica filtrate containing the unreacted silica discharged from the process of manufacturing the high silica zeolite are simultaneously added to the grown nucleus, the pH of the solution may be reduced, and the silica present in the silica filtrate may be activated to be grown from the nucleus and thus synthesize the silica sol. In this case, since sulfuric acid ($SO_4^{2-}$) ions contained in the silica filtrate may control a condensation reaction rate of the silica through an oxyanion effect, the silica sol may be formed without addition of metal ions and an ion exchange process by an ion exchange resin unlike an existing method, and thus the silica sol may be converted into an agglomerated silica gel. When the silica sol grown from the nucleus is additionally maintained in a heating state for 2 to 3 hours, the silica sol is agglomerated, and the reason why the silica sol is agglomerated to form the solated agglomerated silica is that the metal salt is easily removed only by filtering and washing.

In the method of manufacturing the high silica zeolite according to the present invention, it is preferable that solation be performed by adding one kind of acid selected from the group consisting of a hydrochloric acid, a phosphoric acid, and a sulfuric acid to the silica filtrate including the metal salt.

It is preferable that solation be performed at a temperature in the range of 50° C. to 100° C. for 2 to 10 hours. More preferably, solation may be performed for 3 to 7 hours. In the case where the reaction temperature and the reaction time are less than the aforementioned range, since the unreacted silica is present in a great amount, an agglomeration reaction is not smoothly performed to cause peptizing during a subsequent step, and thus it is not easy to perform solation, and in the case where the reaction temperature and time are more than the aforementioned range, the solated particles may be excessively grown. In this case, the reaction temperature and time may be controlled through a particle size of the product.

In the method of manufacturing the high silica zeolite according to the present invention, it is preferable that the size of the solated particle be 20 nm to 100 nm and the particle size of the agglomerated silica where the solated particles are agglomerate be 0.01 mm to 5 mm. In the case where the solated particles are synthesized to have a size of less than 20 nm, a long time is required to perform agglomeration, and in the case where the solated particles are synthesized to have a size of more than 100 nm, it is difficult to perform peptizing during a subsequent step, and thus the sol having a uniform size cannot be synthesized.

Further, in the case where the size of the agglomerated silica where the solated particles are agglomerated is less than 0.01 mm, since porosity between the agglomerated silica particles is small, a long time is required during a filtering process, and in the case where the size is more than 5 mm, since it is difficult to perform peptizing during a subsequent step, a separate pulverization process therefor is required.

In the method of manufacturing the high silica zeolite according to the present invention, step 2 is a step of filtering and washing the solated agglomerated silica of step 1 to manufacture the silica cake from which the metal salt is removed. The silica cake manufactured from step 2 includes 20 to 40 wt % of silica.

The reason why the metal salt is removed during the aforementioned step is that in the case where the metal salt is present in an excessive mount during the process of synthesizing the high silica zeolite, the condensation reaction is accelerated due to the oxyanion effect by the metal salt to intensify agglomeration, and thus it is difficult to obtain the sol having a desired size. Further, when the metal salt is not sufficiently removed during the aforementioned step, in the case where the zeolite is synthesized by using the silica sol obtained by reusing as a silica source, the finally manufactured zeolite is grown in an agglomeration form to reduce uniformity of the zeolite, and thus it is difficult to expect excellent activity as a catalyst.

In the method of manufacturing the high silica zeolite according to the present invention, step 3 is a step of peptizing the silica cake to manufacture the silica sol. Peptizing is a phenomenon that precipitates generated due to coagulation or other solids are dispersed again in a solution to form a colloidal solution, and a base may be added to the silica cake and heated to peptize the silica cake and thus convert the silica cake into the silica sol. In this case, the degree of peptizing is affected from the silica solation process of step 2.

In the method of manufacturing the high silica zeolite according to the present invention, it is preferable that peptizing of step 3 be performed by adding sodium hydroxide (NaOH) or ammonium hydroxide ($NH_4OH$) at a mole ratio of 0.01 to 0.10 based on the silica ($SiO_2$) included in the silica cake, and then performing heating at a temperature in the range of 70° C. to 120° C. The peptizing process may be maintained for 1 to 3 days to convert the solated agglomerated silica into the silica sol. The degree of peptizing is most largely affected by the solation and agglomeration process of step 1.

In this case, in the case where sodium hydroxide (NaOH) or ammonium hydroxide ($NH_4OH$) is added at a mole ratio of less than 0.01 based on silica ($SiO_2$) included in the silica cake, the content of the agglomerated silica not solated but remains in the finally obtained silica is increased, and in the case where sodium hydroxide (NaOH) or ammonium hydroxide ($NH_4OH$) is added at a mole ratio of more than 0.10, the content of cations is increased again, and thus the concentration of the base should be adjusted in the aforementioned range.

Further, it is preferable that heating be performed at 70° C. to 120° C. In the case where heating is performed at the temperature of less than 70° C., sufficient peptizing into the silica sol is not performed but the solated agglomerated silica is present, and in the case where heating is performed at the temperature of more than 120° C., energy more than necessary is supplied to reduce economic feasibility of process energy.

In the method of manufacturing the high silica zeolite according to the present invention, it is preferable that the particle size of the silica sol manufactured during step 3 be 10 nm to 100 nm. In the case where the particle size of the silica sol is less than 10 nm, there is difficulty in recovering, and when the high silica zeolite is synthesized, crystals are agglomerated each other, and in the case where the particle size is more than 100 nm, it is easy to recover the silica, but when the high silica zeolite is synthesized, the silica sol is not used as the silica source.

In the method of manufacturing the high silica zeolite according to the present invention, step 4 is a step of manufacturing the high silica zeolite using the silica sol manufactured in step 3 as the silica source. The silica sol may be used as the silica source in the method of manufacturing the high silica zeolite. Generally, the high silica zeolite is manufactured by crystallizing a mixture of the silica source, an alumina source, a neutralizing agent, and water through hydrothermal synthesis. The method of manufacturing the high silica zeolite using the silica sol as the silica source may be performed by a method such as Korean Patent No. 10-2009-0099550, but is not limited to the aforementioned patent.

In the method of manufacturing the high silica zeolite according to the present invention, it is preferable that the silica sol manufactured during step 3 be included at a ratio of 30 to 100 wt % in the silica source of step 4. In the case where the silicate and the silica sol are mixed at a predetermined ratio to be used as a raw material rather than the case where only the silicate is used as the silica source, the more uniform high silica zeolite having high crystallinity may be synthesized. In this case, in the case where the silica sol is included in the content of less than 30 wt % in the silica source, crystallinity of the high silica zeolite is partially reduced.

Further, the present invention provides a high silica zeolite manufactured from the recovered silica filtrate through the manufacturing method and having a Si/Al mole ratio of 5 or more. According to the manufacturing method, when the method of manufacturing the high silica zeolite, in which the silica sol is manufactured from the recovered silica filtrate to be reused as the silica source during a process of synthesizing the high silica zeolite, is used, since a cation exchange process may be omitted due to an oxyanion effect during a process of converting the silica filtrate into the silica sol, a manufacturing process may be simplified, and the metal salt included as an impurity during a solation process may be removed to prevent agglomeration of the silica sol and thus control the particle size of the silica sol. Further, it is possible to reduce an energy cost, a chemical treatment cost, and a waste water treatment cost and shorten a manufacturing time by reusing the discarded silica filtrate.

In the method of manufacturing the high silica zeolite according to the present invention, the manufactured high silica zeolite may be one kind selected from the group consisting of ZSM-5 (Zeolite Socony Mobil-5), ZSM-22 (Zeolite Socony Mobil-22), ZSM-23 (Zeolite Socony Mobil-23), BEA (beta zeolite), and MOR (mordenite), but is not limited thereto.

Hereinafter, the present invention will be described in more detail with reference to Examples. However, the following Examples are provided for illustrative purposes only, and the scope of the present invention should not be limited thereto in any manner.

Example 1

Manufacturing of High Silica Zeolite 1

Step 1: After the reaction tank was heated to 50° C. and agitated, 1.81 kg of the solution containing 12 wt % of silicic acid ($SiO_2$) and 35.76 kg of distilled water were added and maintained for 30 minutes, and 5.93 kg of the sulfuric acid diluted in the content of 1.75 wt % was added and then maintained for 30 minutes to grow the nucleus. While the reaction tank was heated to the temperature of 70° C., 29.41 kg of the silica filtrate containing 3.5 wt % of the silica ($SiO_2$) and 26.84 kg of 3 wt % of the sulfuric acid were slowly added for 1 hour to synthesize the silica sol including 1.5 wt % of the silica, and the silica sol was left for 2 hours to manufacture the solated agglomerated silica.

Step 2: The solated agglomerated silica was filtered by the filter press, and then washed to manufacture 7.20 kg of the silica cake.

Step 3: After 5.09 kg of distilled water and 0.16 kg of 50 wt % of the sodium hydroxide (NaOH) solution were added to the silica cake manufactured during step 3 and agitated, the temperature of the reaction tank was increased to 90° C. and maintained for 24 hours, and the reaction tank was then cooled to room temperature to manufacture the silica sol so that a mole ratio ($Na_2O/SiO_2$) of sodium oxide to 12 wt % of the silica was 0.02.

Step 4: After 0.07 kg of the crystalline ZSM-5 nucleus mother liquid was added to 16.35 kg of 12 wt % of sodium silicate as the silica source and agitated for 30 minutes, 12.45 kg of the manufactured sol solution was added and agitated for 30 minutes to prepare solution 1. Further, 0.38 kg of aluminum soda and 1.23 kg of water were mixed and agitated for 20 minutes to prepare solution 2. Next, solution 2 was added to solution 1, agitation was performed, and the mixture was added to the Teflon vessel, subjected to hydrothermal synthesis at 170° C. for 24 hours, and cooled at room temperature. The resulting material was dried at 120° C. for 24 hours to manufacture ZSM-5.

Example 2

Manufacturing of High Silica Zeolite 2

ZSM-5 was manufactured by the same method as Example 1, except that 29.41 kg of the silica filtrate and 26.84 kg of 3 wt % of sulfuric acid were slowly added for 2 hours during step 1 of Example 1.

Example 3

Manufacturing of High Silica Zeolite 3

ZSM-5 was manufactured by the same method as Example 1, except that 29.41 kg of the silica filtrate and 26.84 kg of 3 wt % of sulfuric acid were slowly added for 3 hours during step 1 of Example 1.

Example 4

Manufacturing of High Silica Zeolite 4

ZSM-5 was manufactured by the same method as Example 1, except that 29.41 kg of the silica filtrate and 26.84 kg of 3 wt % of sulfuric acid were slowly added for 4 hours during step 1 of Example 1.

Example 5

Manufacturing of High Silica Zeolite 5

ZSM-5 was manufactured by the same method as Example 1, except that 29.41 kg of the silica filtrate and 26.84 kg of 3 wt % of sulfuric acid were slowly added for 5 hours during step 1 of Example 1.

Comparative Example 1

Manufacturing of High Silica Zeolite 2

0.09 kg of the crystalline ZSM-5 nucleus mother liquid was added to 36.87 kg of 12 wt % of soda silicate as the silica source and agitated for 30 minutes to prepare solution 1, and 2.82 kg of aluminum sulfate and 0.22 kg of water were mixed and agitated for 20 minutes to prepare solution 2. Next, solution 2 was added to solution agitation was performed, and the mixture was added to the Teflon vessel, subjected to hydrothermal synthesis at 170° C. for 24 hours, and cooled at room temperature. The resulting material was dried at 120° C. for 24 hours to manufacture ZSM-5.

Experimental Example 1

Size and Concentration of Silica Sol Particle According to Addition of Silica Filtrate In the manufacturing method according to the present invention, in order to check the size and the concentration of the silica sol particles according to addition of the silica filtrate, the size of the silica sol particles grown for a unit time for which the silica filtrate and the acid were simultaneously injected during step 1 of Examples 1 to 5 according to the present invention was measured through the particle analyzer (ELS-Z2, Otsuka), and the result is illustrated in FIG. 1. Further, the intensity of the silica sol particles grown for a unit time for which the silica filtrate and the acid were simultaneously injected during step 1 of Examples 1 to 5 according to the present invention was measured through the particle analyzer (ELS-Z2, Otsuka), and the result is illustrated in FIG. 2.

According to FIG. 1, it can be confirmed that the size of the silica sol particle is increased according to a time for which the silica filtrate is added together with the acid to the solution where the nucleus is generated, and as a reaction time is increased to 3 hours to 5 hours, an increment of the particle size is further improved.

Figure 2:
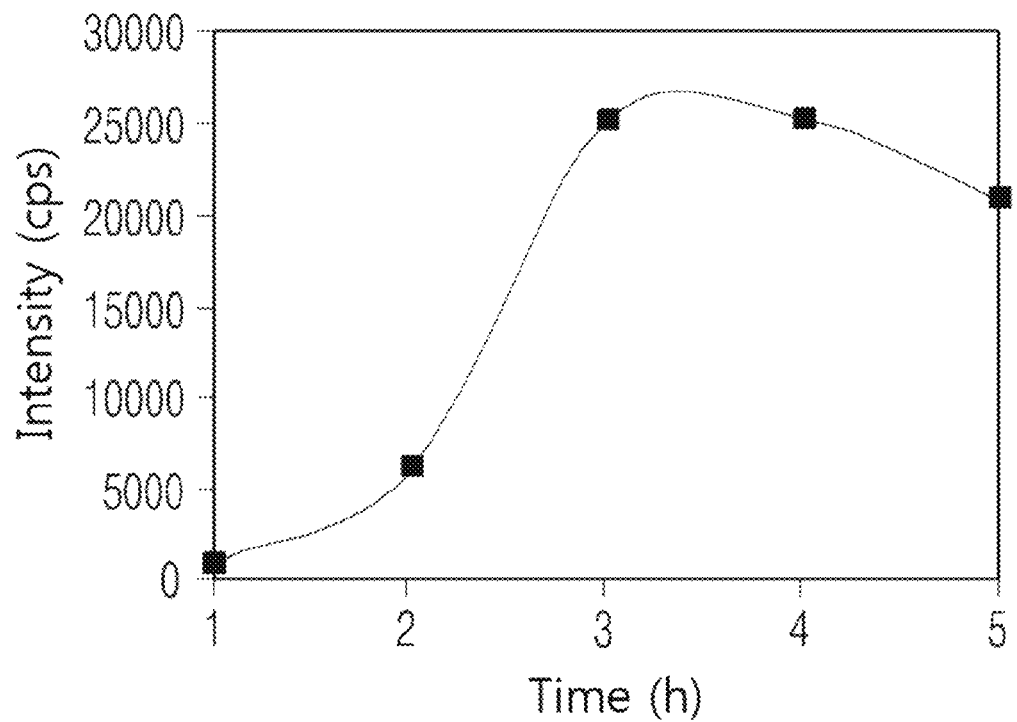
FIG. 2 is a graph illustrating a concentration of a silica sol solution according to the addition time of the recovered silica of Examples 1 to 5 of the present invention.

According to FIG. 2, the concentration of the silica sol particle is increased according to the time for which the silica filtrate is added together with the acid to the solution where the nucleus is generated, and particularly, in the case where the reaction time is 2 hours to 3 hours, through an increase in intensity from about 5000 cps to about 25000 cps by about five times, it can be seen that the concentration of the silica sol particle is increased.

Through this, it can be seen that during the process of synthesizing the silica sol of step 2 of the manufacturing method according to the present invention, in order to obtain the silica sol having the particle size of 10 nm to 100 nm, it is preferable to perform the reaction for 1 hour to 3 hours, and in order to obtain the silica sol at the excellent concentration during the process of synthesizing the silica sol, it is preferable to perform the reaction for 2 hours or more.

Experimental Example 2

Analysis of Fine Structure of High Silica Zeolite

Figure 3:
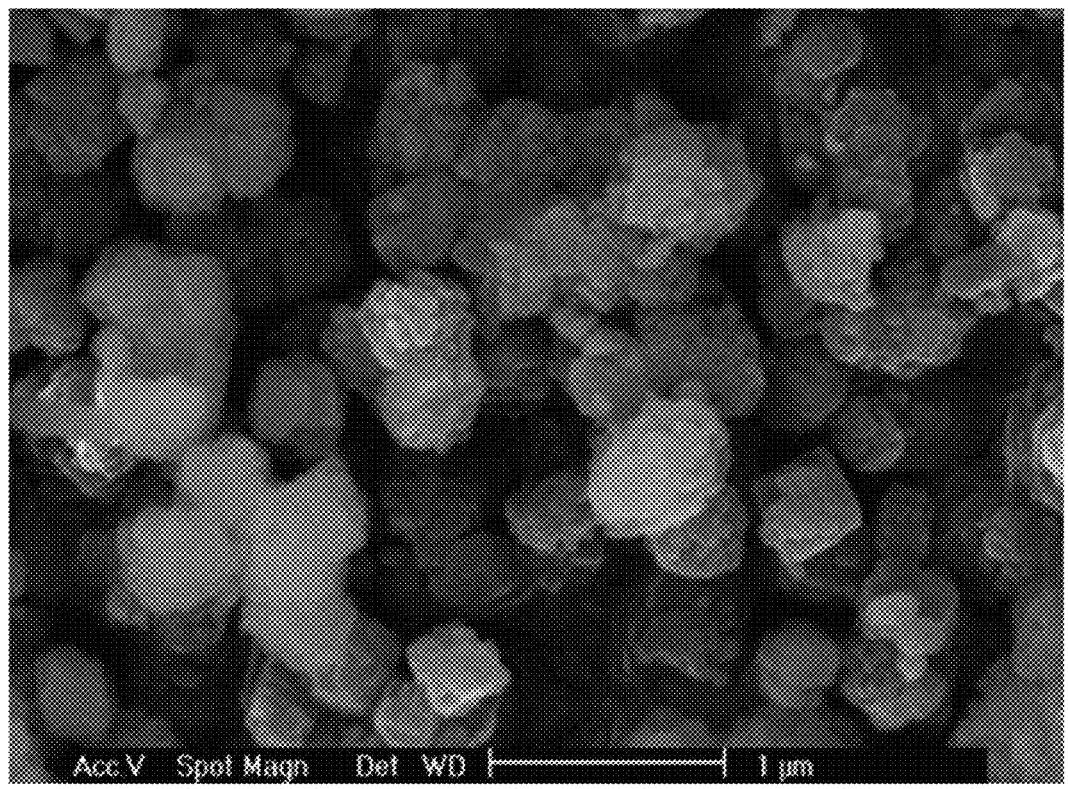
FIG. 3 is a scanning electron microscope image of a ZSM-5 nucleus synthesized by Example 3 of the present invention.
Figure 4:
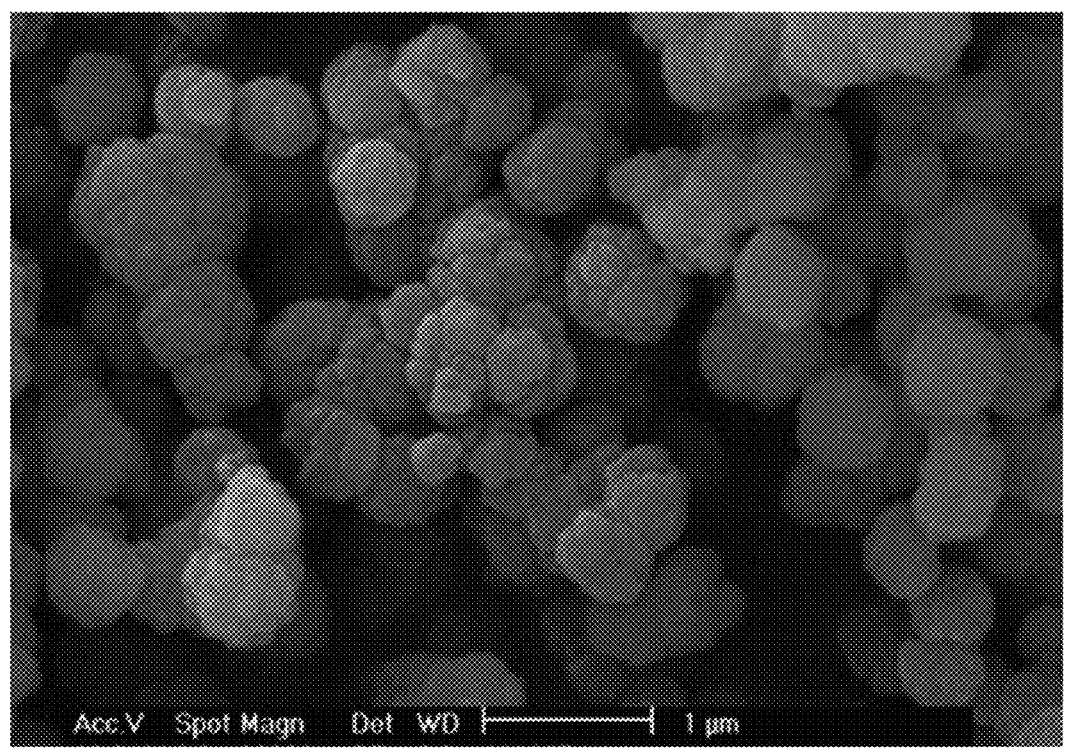
FIG. 4 is a scanning electron microscope image of a ZSM-5 nucleus synthesized by Comparative Example 1.

In order to check the fine structure of the high silica zeolite according to the present invention, ZSM-5 as the high silica zeolite particle manufactured in Example 3 and Comparative Example 1 of the present invention was analyzed by the scanning electron microscope (Akasi Alpha 25A), and the results are illustrated in FIGS. 3 and 4.

According to FIGS. 3 and 4, it can be confirmed that the fine structures of Example 1 and Comparative Example 1 according to the present invention are almost the same as each other in terms of the size and the shape of the particle. Through this, it can be seen that the high silica zeolite manufactured using the silica sol manufactured from the recovered silica filtrate as the silica source according to the present invention is formed in the same type as a high silica zeolite manufactured through an existing method.

Experimental Example 3

Crystalline Structure of High Silica Zeolite

Figure 5:
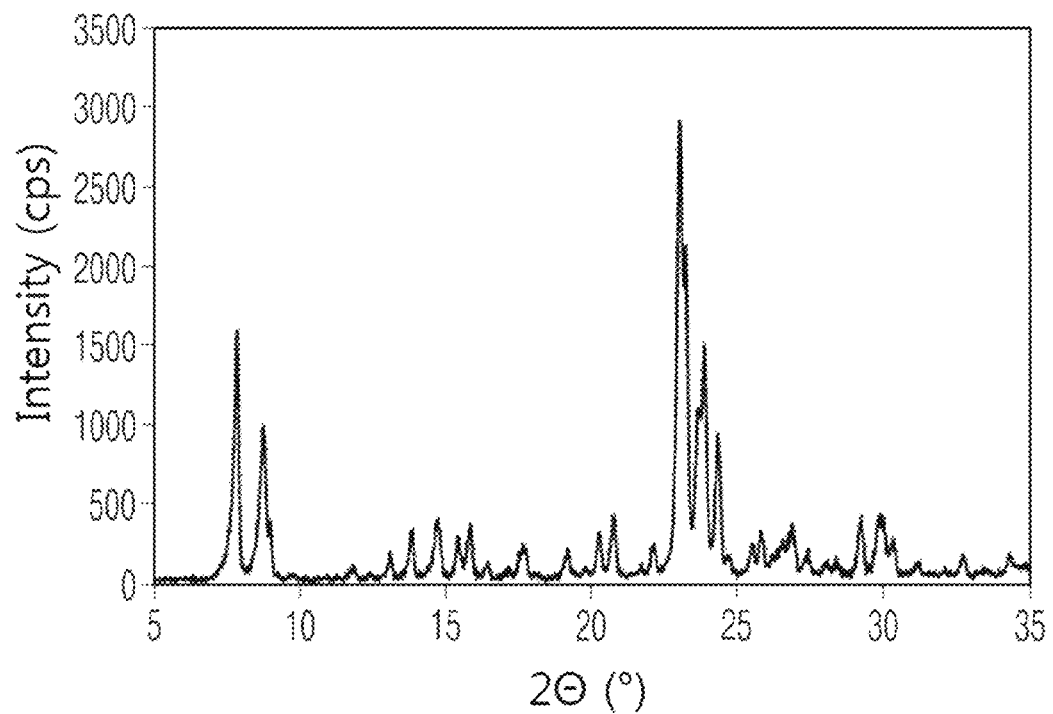
FIG. 5 is an X-ray diffraction analysis image of the ZSM-5 nucleus synthesized by Example 3 of the present invention.
Figure 6:
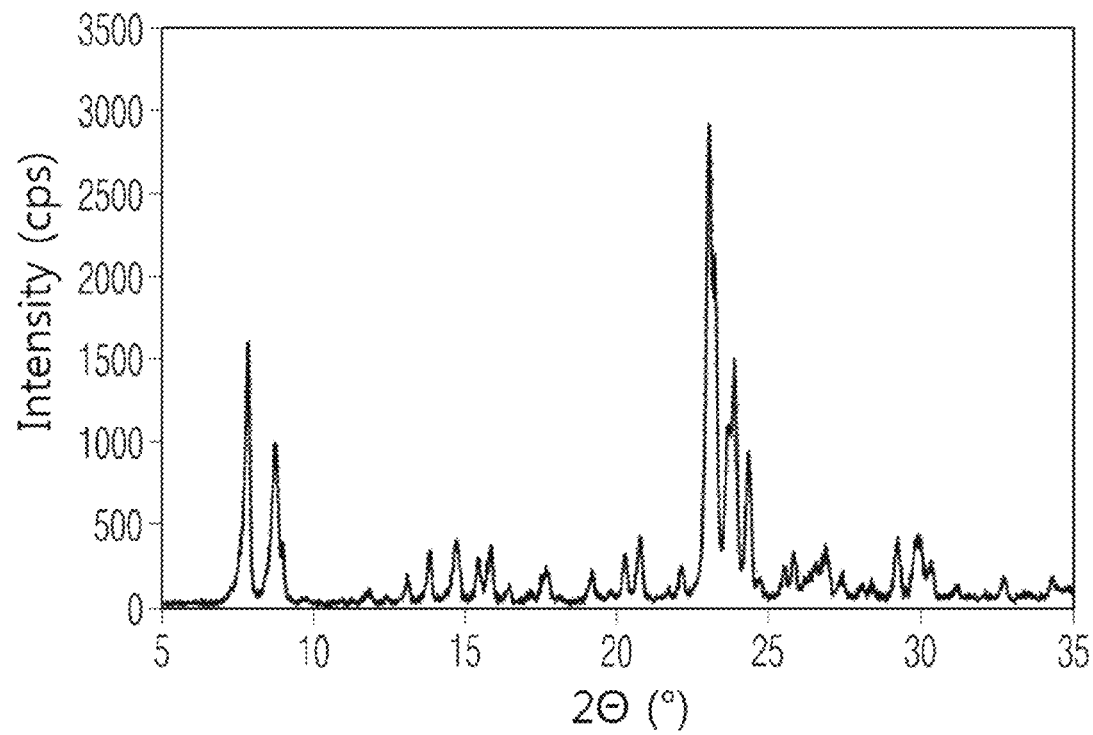
FIG. 6 is an X-ray diffraction analysis image of the ZSM-5 nucleus synthesized by Comparative Example 1.

In order to check the crystalline structure of the high silica zeolite according to the present invention, the results of ZSM-5 as the high silica zeolite particle manufactured in Example 3 and Comparative Example 1 of the present invention were measured through the X-ray diffraction analyzer (Rigaku, miniflex II), and the results are illustrated in FIGS. 5 and 6.

According to FIGS. 5 and 6, it can be confirmed that the crystalline structures of the high silica zeolite manufactured in Example 1 and Comparative Example 1 according to the present invention are the same as each other. Through this, it can be seen that the high silica zeolite manufactured using the silica sol manufactured from the recovered silica filtrate as the silica source according to the present invention is formed to have the same crystalline structure as a high silica zeolite manufactured through an existing method.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of manufacturing a high silica zeolite using a recovered silica filtrate, comprising:
    manufacturing a solated agglomerated silica from a silica filtrate including a metal salt (step 1);
    filtering and washing the solated agglomerated silica of step 1 to manufacture a silica cake from which the metal salt is removed (step 2);
    peptizing the silica cake to manufacture a silica sol (step 3); and
    manufacturing the high silica zeolite using the silica sol manufactured in step 3 as a silica source (step 4).

2. The method as set forth in claim 1, wherein in step 1, the solated agglomerated silica is manufactured by growing the silica filtrate including the metal salt from a nucleus, and performing solation and then agglomeration.

3. The method as set forth in claim 2, wherein the nucleus is generated by mixing a silicate that is one kind selected from the group consisting of potassium silicate, sodium silicate, lithium silicate, and a mixture thereof, including 1 to 20 wt % of the silica, and an acid.

4. The method as set forth in claim 2, wherein a size of solated particles is 20 nm to 100 nm, and a particle size of the agglomerated silica where the solated particles are agglomerate is 0.5 mm to 5 mm.

5. The method as set forth in claim 2, wherein the solation is performed by adding one kind of acid selected from the group consisting of a hydrochloric acid, a phosphoric acid, and a sulfuric acid to the silica filtrate including the metal salt.

6. The method as set forth in claim 1, wherein the peptizing of step 3 is performed by adding sodium hydroxide (NaOH) or ammonium hydroxide ($NH_4OH$) at a mole ratio of 0.01 to 0.10 based on the silica ($SiO_2$) included in the silica cake, and then performing heating at a temperature in a range of 70° C. to 120° C.

7. The method as set forth in claim 1, wherein a particle size of the silica sol manufactured in step 3 is 10 nm to 100 nm.

8. The method as set forth in claim 1, wherein the silica sol manufactured in step 3 is included in the silica source of step 4 at a ratio of 30 to 100 wt %.

* * * * *